United States Patent Office 2,794,382
Patented June 4, 1957

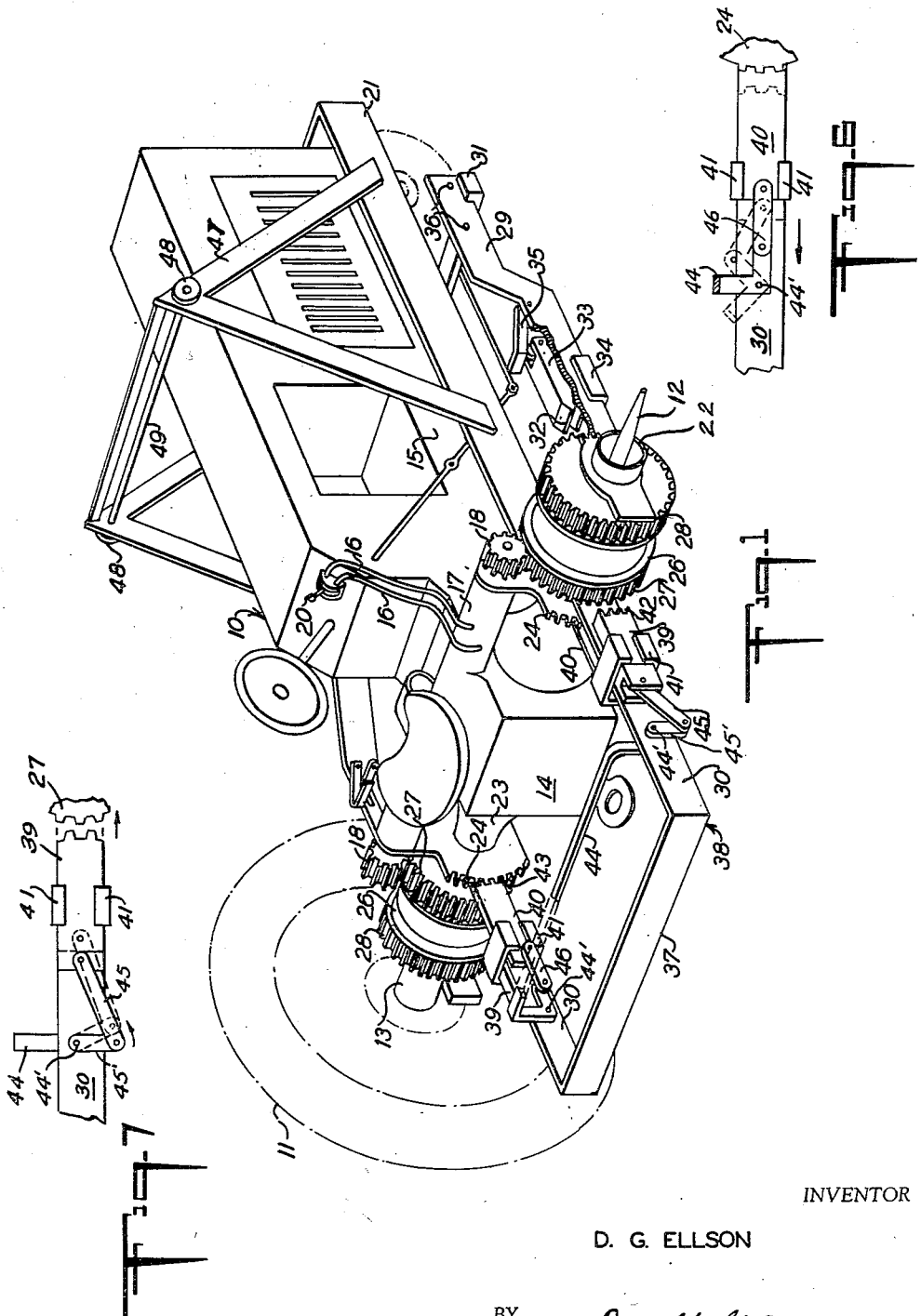

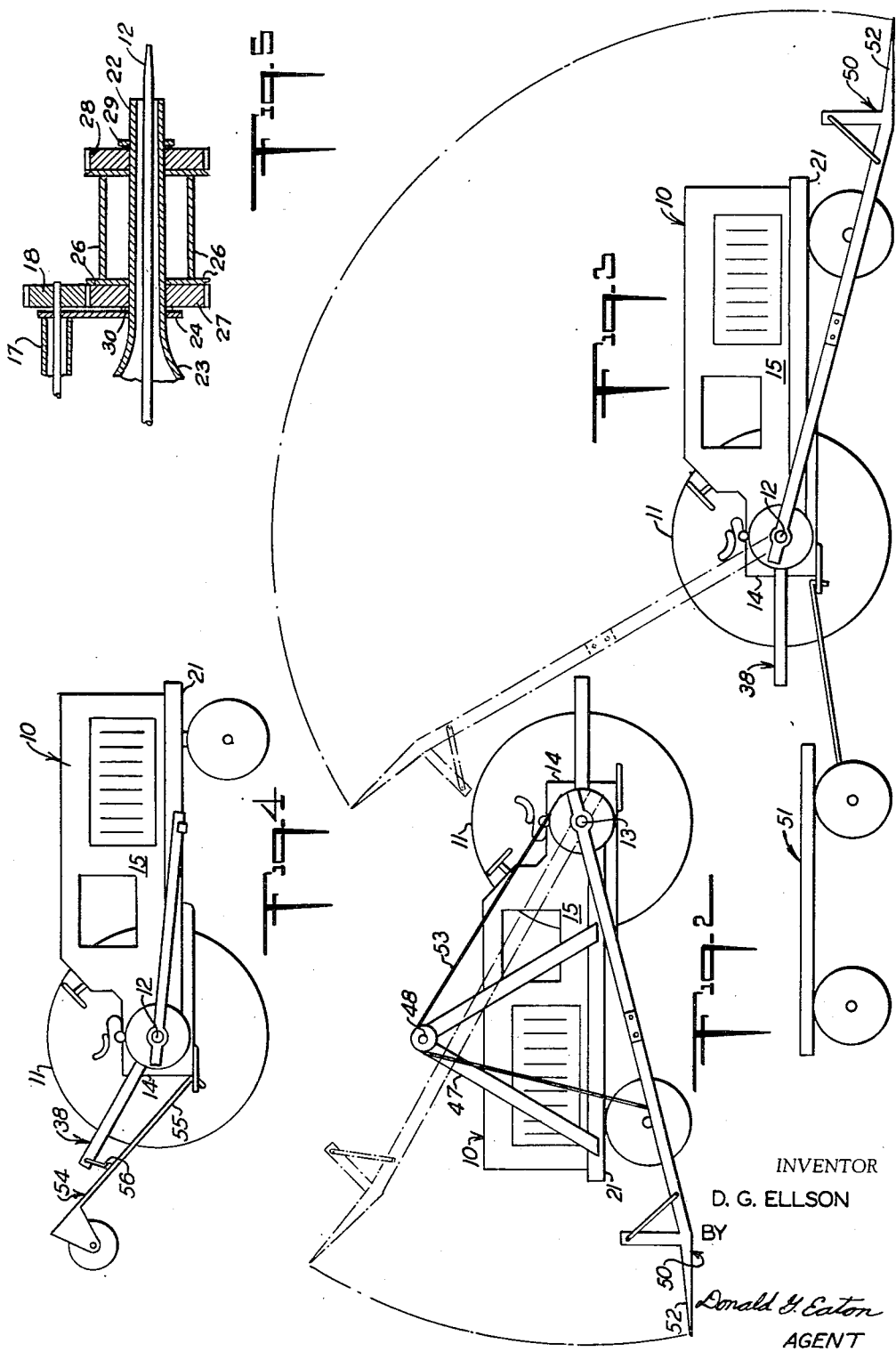

2,794,382

MULTI-PURPOSE ROTATING MOUNT AND DRIVE FOR TRACTOR-OPERATED EQUIPMENT

Douglas G. Ellson, Bloomington, Ind.

Application March 3, 1954, Serial No. 413,823

4 Claims. (Cl. 97—46.41)

This invention relates to the mounting and operation of auxiliary equipment utilized in conjunction with a tractor and more particularly to a multi-purpose device which provides for mounting a plurality of such auxiliary equipment on the tractor and for selective operation of this equipment by means of a single power unit.

It is common practice to equip automotive tractors with hydraulic pumps. Power from these pumps is utilized in the operation of a variety of specialized auxiliary equipment or for lifting the equipment for transport. For this purpose, one or more hydraulic cylinders is incorporated into each piece of auxiliary equipment, with the result that there is considerable duplication of parts in a complete set of such equipment used with a single tractor and capable of performing the variety of jobs to be done on the typical farm. There is similar duplication of parts when each piece of auxiliary equipment incorporates its own wheels for transport. The present invention is designed to reduce much of this duplication in the equipment system comprising the tractor and the auxiliary devices operated in conjunction with it.

The invention is designed to be attached to or incorporated as a part of a wheel-type or track-type tractor. It combines structures upon which a variety of auxiliary equipment may be mounted with powered rotational motions suitable for their operation. The invention provides for selective rotation of two pairs of arms and a pair of arms and a pair of winch drums. One pair of rotating arms is adapted to the mounting and operation of equipment such as a fork or bucket loader, bull-dozer blade, or buck rake, all of which are normally operated by lifting and lowering at the front of the tractor. Two modes of operation are provided for: heavy lifting to limited heights, and light lifting of loads picked up at the front of the tractor and unloaded in front of, above, or at the rear of the tractor. The same pair of arms connected by a bar at the rear of the tractor to form a U-shaped frame, provides a mount and means for raising and lowering and otherwise operating equipment such as plows, chisels, harrows, seeders, scrapers, etc., normally pulled or mounted behind the tractor. This frame also functions as a jack for the tractor on which it is mounted or for other vehicles.

The winches permit the performance of operations which require pulling of cables, such as the operation of a crane, post-pulling, fence stretching etc.

It is therefore, an object of this invention to provide means for mounting and operating the auxiliary equipment normally utilized in conjunction with a tractor.

A further object of the invention is the provision of means for selectively mounting the auxiliary equipment normally mounted at the front, underneath or at the rear of a tractor.

A still further object of the invention is the provision of means utilized in conjunction with a tractor for lifting heavy loads a relatively short distance or a light load a relatively greater distance.

Another object of the invention is the provision of means for mounting and operating the auxiliary equipment normally utilized in conjunction with a tractor which means substantially eliminates duplication of parts in the auxiliary equipment.

A further object of the invention is the provision of a single mount and drive unit on a tractor for operating a plurality of different types of auxiliary equipment.

A still further object of the invention is to reduce the cost of a tractor and auxiliary equipment by substantially eliminating duplication of parts.

Another object of the invention is to increase the versatility of a tractor and associated auxiliary equipment.

Further objects and advantages of the invention will be apparent from the following description taken in conjunction with the accompanying drawings wherein:

Fig. 1 is a view in perspective of a tractor with one wheel removed and showing the mounting and operating means for auxiliary equipment;

Fig. 2 a side elevational view of a tractor and showing the mounting and operating means for a fork mounted at the front of the tractor;

Fig. 3, a side elevational view of a tractor showing the mounting and operating means for a fork for picking up a load at the front of the tractor and unloading the same onto a vehicle towed behind the tractor;

Fig. 4 a side elevational view of a tractor and showing the mounting and operating means for auxiliary equipment at the rear of the tractor;

Fig. 5, a fragmentary sectional view showing the relative relationship of the drive gears and winch drum;

Fig. 6, a fragmentary side elevational view showing the operation of the locking blocks; and Fig. 7, a fragmentary side elevational view showing the operation of the clutch blocks.

With continued reference to the drawings the invention is shown mounted on a typical farm-type automotive tractor 10 with large rear drive wheels 11 mounted on axles 12 and 13 projecting from the sides of an enclosed transmission box 14, which is a part of the chassis or frame 15 of the tractor 10. The tractor 10 is provided with a hydraulic pump which supplies fluid under pressure through tubes 16 to a hydraulic motor 17. The motor 17 is reversible and serves to drive pinion gears 18. Hydraulic motor control 20 provides for rotation of the drive pinions 18 in either direction and permits them to be fixed against rotation or released for free rotation.

The frame 21 of the equipment mount is rigidly attached to the chassis frame 15 of the tractor 10. Extending laterally from the equipment mount frame 21 on either side are hollow cylindrical bearings 22. These bearings surround and are concentric with the axle housing 23 of the tractor.

Extensions of the equipment mount frame 21 to the rear are formed as gear sectors 24 centered at the axis of the bearings 22.

Mounted so as to rotate freely on each bearing 22 are three structures, duplicated on the right and left bearings. These structures are the drive unit 26, 27 and 28, an outer or forward operating arm 29 and an inner or rear operating arm 30. The drive unit consists of a winch drum 26 between two gears 27 and 28 which are rigidly attached to it. The inner or drive gear 27 of each drive unit engages drive pinions 18 so that each drive unit is continuously engaged with the drive motor 17. The outer gear 28 of each drive unit is used to engage each outer arm 29 with the drive unit. The relationship of winch drum 26, gears 27 and 28 and arms 29 and 30 on the bearing 22 is best shown in Fig. 5.

The outer arms 29 rotate freely on the bearings 22 and normally extend forward. When not in use arms 29 are supported by means of brackets 31 which extend outwardly from each side of the frame 21. Gear teeth 32 on a clutch 33 which slides in guides 34 on the outer arm 29 serve to clutch the arm 29 with the outer gear 28 of the drive unit. The teeth 32 of the clutch 33 are engaged and disengaged with the gear 28 by means of the operating handle 35 which is linked to the clutch block 33.

The forward end of the outer arm 29 is adapted for attachment of auxiliary equipment by any suitable means such as screw threaded fastening means engaging the apertures 36.

The inner arm 30 also rotates freely on the bearing 22. It is connected by a bar 37 with the corresponding inner arm 30 on the opposite side of the tractor, the two arms 30 and the bar 37 forming a U-shaped frame 38 which normally extends to the rear of the tractor. The radius of the frame 38 is slightly greater than the outside radius of the tractor wheels 11. The structure of the bar 37 is adapted for attachment or suspension of auxiliary equipment.

Each of the inner arms 30 is adjacent to and between the drive gears 27 and the extensions of the equipment frame 21 on which are provided the gear sectors 24. Provisions is made for selective engagement of the inner arms 30 with the rotatable drive gears 27 or with the fixed gear sectors 24. Clutch blocks 39 and locking blocks 40 are slidably mounted in guides 41 which are rigidly mounted on the arms 30. Teeth 42 are provided on clutch blocks 39 and teeth 43 are provided on locking blocks 40. An offset control rod 44 is connected by means of links 45 to each of the clutch blocks 39 and by means of links 46 to each of the locking blocks 40. The linkage between the control rod 44 and blocks 39 and 40 is so arranged that at one extreme position of the control rod 44, such as that shown in Fig. 1, and in full lines in Fig. 6 the teeth 43 of both locking blocks 40 are engaged with the gear sectors 24 and the teeth 42 of the clutch blocks 39 are disengaged from the drive gears 27 as shown in full lines in Fig. 7 and at the other extreme position of the control rod 44 approximately ninety degrees from the first as shown in dotted lines in Figs. 6 and 7, the locking blocks 40 are disengaged from the gear sectors 24 and the clutch blocks 39 are engaged with the drive gears 27. At an intermediate position of the control rod 44, both sets of blocks 39 and 40 are partially engaged with the gear sectors 24 and drive gears 27. The control rod 44 is connected to the locking blocks 40 through links 46 and to pivot pins 44' extending through arms 30 and fixed to lever arms 45' which in turn are connected through links 45 with the clutch blocks 39.

A part of this invention is a detachable A-frame 47 upon which is mounted two pulleys 48. The A-frame assembly 47 is rigidly attached to the frame 21. The two pulley wheels 48 rotate freely upon a shaft 49 and are supported in line with the winch drums 26.

One type of auxiliary equipment to which this invention is adapted is fork or shovel lifting or loading devices 50. These may be mounted as extensions of the outer arms 29 and rotated overhead from the front to the rear of the tractor by engaging the teeth 32 on the blocks 33 on the outer arms directly with the gears 28 of the drive unit. As shown in Fig. 3, this range of rotation or "throw," in excess of 180°, permits picking up material in front of the tractor and loading it directly into a wagon 51 being drawn behind the tractor, or use of the loader 50 as an elevator for raising material placed in the scoop 52, to loft or bin opening above or behind the tractor.

An alternative method of operating loading equipment when the load is great and overhead transport or unloading is not required, is shown in Fig. 2 and utilizes the winch drums 26 for a cable drive, applying the power of the drive unit with greater mechanical advantage. In this method of operation the teeth 32 on blocks 33 on the outer or forward unit are disengaged from the gears 28 allowing the arms 29 to rotate freely upon the bearings 22. The A-frame structure 47 is mounted at the front end of the tractor 10 and cables 53 are passed from the winches 26 over the pulleys 48 and down to the arms 29 or their extensions, near the point at which the fork or bucket 52 is attached.

The forward arms 29 may also be utilized for mounting and lifting or otherwise operating conventional auxiliary equipment such as the cultivator and mowing machine which are operated beneath or alongside the tractor. One or both arms 29 may be engaged with the gears 28 of the drive unit in order to raise and lower these tools when in use and for transport.

The U-shaped frame 38 formed by the bar 37 joining the two inner arms 30 which normally extends to the rear of the tractor serves as a mount for equipment such as the scraper, chisel, or sub-soiler, which require positive vertical positioning in use. By mounting these tools directly on the arm or frame 38 their position with respect to the ground surface can be set and controlled by means of the motor controls 20.

Equipment such as plows and harrows 54 which are pulled behind the tractor by a tongue 55 can be attached to or suspended from the frame 38 by suitable connecting rods 56. Except for this suspension, no special design of this standard equipment is required. During operation downward pressure may be applied to the equipment by depressing the arms 30 by means of the motor controls 20. Raising the arms 30 lifts the equipment, suspending it above the ground for transport, as shown in Fig. 4.

Since provision is made for locking either pair of arms 29 or 30 in a fixed position when disengaged from the drive unit, the equipment mounted on one pair of arms may be operated while that mounted on the other pair is being transported and vice versa.

Since the U-shaped frame 38 joining the inner arms extends beyond the circumference of the tractor wheels 11, it may be inserted under other vehicles or structures to raise them functioning as a jack or as a device for aiding in the unloading of wagons by tipping. In addition, by rotating the frame 38 downward to a vertical position it functions as a powered jack by raising the rear wheels 11 of the tractor 10 on which it is mounted off the ground. By the addition of simple attachments such as clamps and chains the frame 38 can also be used to pull or drive posts.

One purpose for the winches 26 has already been mentioned as a means of heavy-duty lifting. In addition, by disengaging both pairs of arm 29 and 30 from the gears 28 and 27 of the drive unit the winches 26 may be used for any purpose for which the pulling of a cable is necessary such as the operation of a crane mounted on the tractor or mounted independently, as well as the operation of an automatic wagon unloader belt.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A unit for mounting and operation of auxiliary equipment on an automotive vehicle having front and rear axles with wheels and a source of auxiliary power, said unit comprising rotary bearing means adapted to be mounted around one of said axles concentrically therewith, a winch drum rotatably mounted on said bearing means, reversible drive means operably connected to said source of auxiliary power and operably associated with said winch drum for rotation thereof, gears fixed to said winch drum, a frame rotatably mounted about the axis of said axle, means associated with said frame for selective engagement with said gears for rotation therewith, at least one arm rotatably mounted about the axis of said axle, and means associated with said arm for selective engagement with said gears for rotation therewith.

2. A unit for mounting and operation of auxiliary equipment on an automotive vehicle having front and rear axles with wheels and a source of auxiliary power, said unit comprising bearing means adapted to be mounted around said rear axle concentrically therewith, a winch drum rotatably mounted on said bearing means, gear means operably associated with said winch drum for rotation thereof, a reversible drive means connected to said source of auxiliary power and operably associated with said gear means, a U-shaped frame rotatably mounted on said bearing means, means for engaging and disengaging said frame with said gear means for rotation thereby, at least one arm rotatably mounted on said bearing means and means associated with said arm for selective engagement with said gear means for rotation of said arm therewith.

3. A unit for mounting and operation of auxiliary equipment on an automotive vehicle having front and rear axles with wheels and a source of auxiliary power, said unit comprising bearing means adapted to be mounted around said rear axle, a winch drum rotatably mounted on said bearing means, gear means operably associated with said winch drum for rotation therewith, reversible drive means connected to said source of auxiliary power and operably associated with said gear means, a U-shaped frame rotatably mounted on said bearing means, means associated with said frame for selective engagement with said gear means for rotation of said frame therewith, means for supporting said frame in a fixed position, an arm rotatably mounted on said bearing means, means associated with said arm for selective engagement with said gear means for rotation of said arm therewith and means for supporting said arm in a fixed position.

4. A unit for mounting and operation of auxiliary equipment on an automotive vehicle having front and rear axles with wheels and a source of auxiliary power, said unit comprising bearing means adapted to be mounted around said rear axle, a winch drum rotatably mounted on said bearing means, a ring gear rigidly mounted on said winch drum, a spur gear engaging said ring gear, reversible drive means connected to said source of auxiliary power and to said spur gear, a U-shaped frame having its outer ends rotatably mounted on said bearing means, a gear segment rigidly mounted on said vehicle, a pair of blocks slidably mounted on said frame and having gear teeth thereon, one of said blocks being positioned to engage its gear teeth with said ring gear, the other of said blocks being positioned to engage its teeth with said gear segment, control means operable in one position for engaging both of said blocks and in alternate positions for selectively engaging either of said blocks, at least one arm rotatably mounted on said bearing means adjacent said winch drum, a gear mounted on said winch drum and a block having gear teeth slidably mounted on said arm and selectively engageable with said gear and means on said vehicle for supporting said arm in a fixed position.

References Cited in the file of this patent

UNITED STATES PATENTS

| 1,834,675 | Booth | Dec. 1, 1931 |
| 2,304,524 | Zeilman | Dec. 8, 1942 |

FOREIGN PATENTS

| 973,409 | France | May 17, 1950 |